(12) United States Patent
Bucher et al.

(10) Patent No.: US 8,346,924 B1
(45) Date of Patent: Jan. 1, 2013

(54) PRECONFIGURATION OF WIRELESS NETWORK ACCESS FOR PORTABLE DEVICES

(75) Inventors: Timothy Bucher, Geyserville, CA (US); Mark Andrew Ross, San Carlos, CA (US); Arthur Anthonie van Hoff, Menlo Park, CA (US)

(73) Assignee: Dell Products L.P., Round Rock, TX (US)

( * ) Notice: Subject to any disclaimer, the term of this patent is extended or adjusted under 35 U.S.C. 154(b) by 1064 days.

(21) Appl. No.: 12/326,549

(22) Filed: Dec. 2, 2008

(51) Int. Cl.
*G06F 15/173* (2006.01)

(52) U.S. Cl. ........ 709/225; 709/219; 709/226; 709/229; 726/2; 726/3; 726/9; 726/12; 726/21; 713/155; 713/168; 707/781; 707/782; 707/783; 707/784; 707/785; 711/163; 725/31

(58) Field of Classification Search .................. 726/4
See application file for complete search history.

(56) References Cited

U.S. PATENT DOCUMENTS

| | | | |
|---|---|---|---|
| 7,593,366 B2* | 9/2009 | Sistla et al. | 370/328 |
| 2002/0002678 A1* | 1/2002 | Chow et al. | 713/169 |
| 2004/0168184 A1* | 8/2004 | Steenkamp et al. | 725/31 |

* cited by examiner

*Primary Examiner* — Nathan Flynn
*Assistant Examiner* — Bryan Wright
(74) *Attorney, Agent, or Firm* — Kirton McConkie; Brian Tucker

(57) ABSTRACT

Systems and methods for pre-configuring a media device or other information handling system so as to be authorized to gain access to one or more destination networks. Pre-configuring the device includes determining what admission requirements the destination network providers require for access and then generating and providing to the media device a network admission coupon that includes the required information. In some embodiments this may be accomplished by a service center, which removes the need for additional authentication steps to be performed by the media device or the destination network providers.

22 Claims, 6 Drawing Sheets

PRECONFIGURATION OF WIRELESS NETWORK ACCESS FOR PORTABLE DEVICES

CROSS-REFERENCE TO RELATED APPLICATIONS

Not Applicable.

BACKGROUND OF THE INVENTION

1. The Field of the Invention

The present invention relates generally to media devices including portable media devices. More specifically, embodiments of the present invention relate to methods and systems for configuring a media device such that the media device may access networks in one or more physical location.

2. The Relevant Technology

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One of the advantages afforded by technological improvements is the ability to distribute to digital media. Digital media (e.g., music, video, Internet data, sports data, news data, weather data, etc.) can be distributed to media devices via various networks including the Internet as well as wireless communication, such as satellite radio, WiFi, cellular networks, and the like.

Many different types of devices have been developed to enjoy the growing availability and diversity of digital media. Devices such as MP3 players, portable CD players, portable DVD players, notebook computers, cellular telephones, personal digital assistants (PDAs), are examples of devices that can interact with digital media. Digital media can also be enjoyed on other non-portable devices as well such as on desktop computers.

Digital media can be distributed to portable media devices via a cable connection or wireless communication, such as satellite radio, WiFi, cellular networks, and the like. A variety of media content providers are available for distributing music, video, Internet data, sports, news, weather, and the like, to portable media devices.

The portability of media devices allows users to take their portable devices to different locations, such as a school, a library, a coffee shop, a hotel, a friend's house, on vacation, etc. While traveling with a media device, a user may desire to acquire media content for the device. Often, media content providers are accessible by connecting the media device to an available network. However, a media device must be properly configured to access a particular network. Public and private locations having available networks oftentimes have different requirements and procedures for accessing that particular location's network. In general, a web browser interface is required to perform the necessary steps to gain access to an available network. Media devices without web browser capabilities often have difficulty in accessing some networks.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF THE INVENTION

These and other limitations are overcome by embodiments of the invention which relate to systems and methods for pre-configuring a media device such that the media device may interface with media content providers via one or more networks. This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

An embodiment disclosed herein relates to systems and methods for pre-configuring a media device so that the media device may access one or more destination networks. The method may be practiced in a system including a media device that receives content or services from media content providers via a network connection. The method comprises receiving a request from a media device for access provided by a predetermined destination network provider, determining the network admission requirements that are required by the selected destination network provider in order for the media device to gain access to the destination network, generating an admission coupon based on the satisfied admission requirements, and providing the admission coupon to the media device, wherein the admission coupon is configured to allow the media device to gain access to the selected destination network without the need for additional authentication from the selected destination network provider.

An additional embodiment disclosed herein relates to a service center for providing a network authorization interface between one or more media devices and one or more destination network providers. The service center comprises: a processor; one or more transceivers for transferring data between the service center and the media devices and between the service center and the destination network providers; memory modules for storing information required to authorize the media devices to gain access to destination networks from the destination network providers; and a network admission module configured to process one or more network admission coupons based on the admission requirements to authenticate the media devices and configured to provide the one or more network admission coupons to the media devices, the one or more network admission coupons configured to authenticate the media devices to gain access to the destination network providers without additional authentication steps by the media devices and the destination network providers.

Additional features and advantages will be set forth in the description which follows, and in part will be obvious from the description, or may be learned by the practice of the teaching herein. The features and advantages of the teaching herein may be realized and obtained by means of the instruments and combinations particularly pointed out in the appended claims. These and other features will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
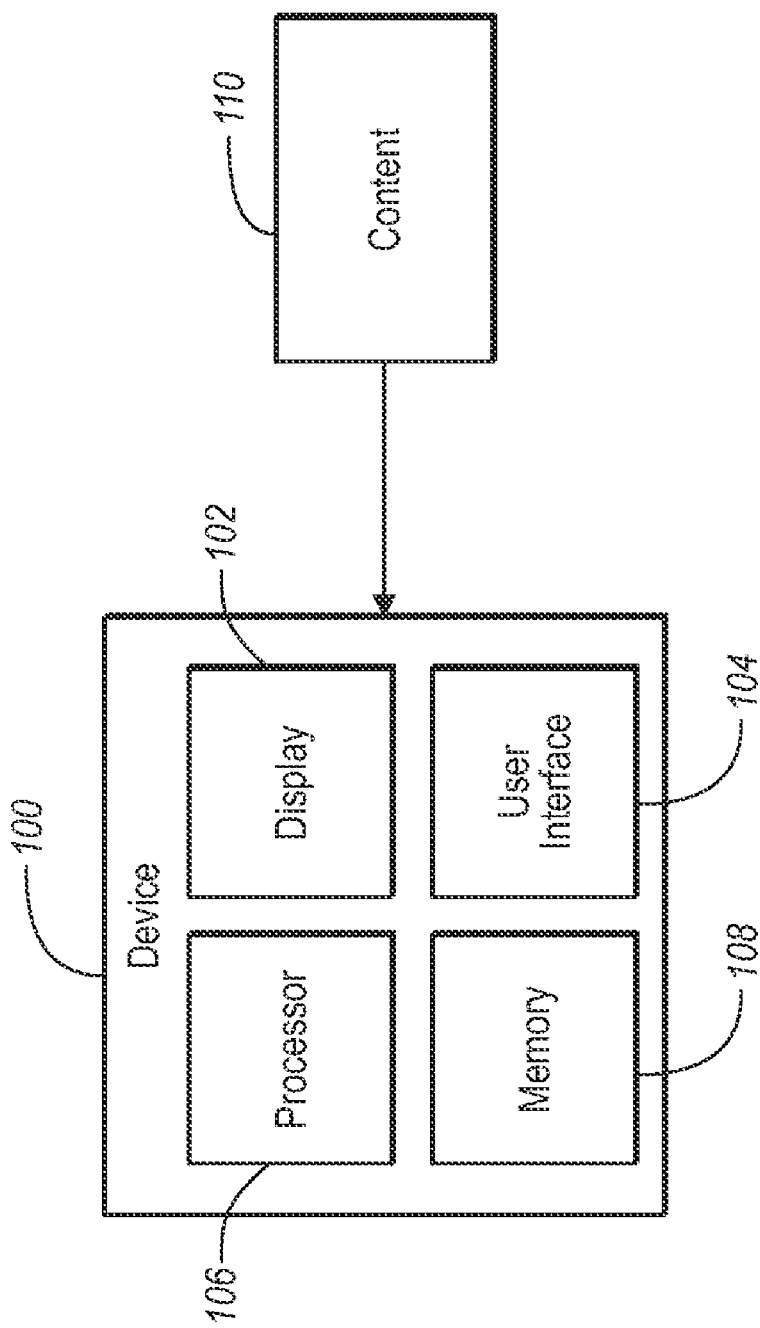
FIG. 1 illustrates one embodiment of a schematic drawing of a portable media device.

In the following detailed description, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Embodiments of the invention relate to systems and methods for configuring a media device to access a network. A media device can be pre-configured to a particular network such that the media device has access to that network at the appropriate time. This enables devices achieve network connectivity and relieves the user from the difficulty of establishing network connectivity when the network is initially encountered.

Since many media content providers are accessible only via a network such as the Internet, a media device may connect to a network in order to gain access to media content available from the media content provider. Typically, a device may access the Internet via a personal computer or a laptop with Internet access. For example, a media device may be configured to connect directly to a USB port on a computer and media content can be downloaded by the computer and stored or synchronized on the device. However, since an Internet-accessible computer is not always available or because a given compute may not recognize a particular device, a user may desire to access media content directly from a network without the use of a computer. For example, a user may desire to access media content directly from several different locations, such as from school, work, a library, a coffee shop, a friend's house, a hotel, etc. Thus, the media device should be configured to directly interface with the particular network at each different location. Configuring a device for a particular location or for a particular network associated with the location can eliminate the need to have the assistance of a computer or browser.

As previously mentioned, many networks often have certain procedures, requirements, or conditions that should be satisfied before access to the network is granted. In fact, many public and private networks require that a user accept certain terms and conditions of use and some require payment before allowing a user to access the network. Most of the applications used by networks to allow a user access are configured to interface with the user via a web browser. Since many media devices do not have a web browser capabilities, or because the size of the screen makes is difficult to browse the network, it may not be possible to initially configure the device to access a network from the network itself because, without a web browser, a user cannot fill out the required forms, accept the terms and conditions of use, provide payment information, etc. By pre-configuring a media device to access outside networks, a user avoids the problems associated with accessing a network without a web browser.

Embodiments of the invention relate to systems and methods for pre-configuring a media device such that the media device may interface with media content providers via one or more networks directly. Pre-configuring the device may include creating a device configuration with a service center and receiving admission coupons (or other form of authentication or payment) to the destination network providers to be accessed. The service center maintains the device configuration and allows a user to perform device association and device management by modifying the device configuration. In addition, the service center interfaces with the network access providers to determine the admission requirements of each provider. The service center allows a device user to perform the necessary access requirements such that an admission coupon may be generated and provided to the media device allowing access to the networks and media content providers.

When interfacing with the service center, a media device may create and register a new device configuration, access an existing device configuration, or acquire an admission coupon without registering a device configuration. Device configurations may be associated with a particular device using a unique device serial number provided by the device manufacturer. Registering the device configuration with the service center causes the service center to store the particular configuration associated with a certain media device, thereby allowing a user to manage the destination networks and media content providers associated therewith. Once a device configuration is registered with the service center, a user may choose to associate that configuration with multiple devices. For example, when a user buys another media device, the new device may be associated with the existing device configuration so that the user can use the new device at all the locations designated in the existing configuration. The number of media devices that may be associated with a particular device configuration may be unlimited. Further, a user may also add additional users to an existing device configuration. This feature allows a user to share the user's device configuration with family members and friends who may wish to access the same media content and networks.

In addition, the service center may also determine when changes are made to the admission requirements and may then ensure that the admission coupon is changed or updated to reflect these changes. Advantageously, this ensures that the media device is at least partially immune to changes to authentication or other network requirements.

FIG. 1 illustrates an embodiment of a device that can be pre-configured to directly access one or more networks. Examples of the device 100 may include, by way of example and not limitation, a satellite radio device, a portable audio player (MP3 player or iPod), a portable DVD or CD player, a personal computer, a laptop computer, a cellular telephone, a personal digital assistant (PDA), and the like or any combination thereof. Embodiments of the invention generally refer to portable media devices, but one of skill in the art can appreciate that embodiments of the invention can be used with other devices able to access media content from a network.

Typically, the device 100 includes a display 102 that can convey information to the user of the device. For example, when the device 100 renders digital audio data, the display 102 may indicate the song title, the artist, the album title, the track number, the length of the track, and the like or any combination thereof. The device 100 also includes a user interface 104 (such as control buttons, touch screen, capacitive input, etc.) or other means of providing input to the device 100. The user interface 104, by way of example, enables a user to navigate and activate the digital media and other content that is stored on the memory 108 of the device 100 or to navigate and perform any digital media or content that is received from an external source or that is stored on the device 100. The user interface 104 may enable a user to switch to another channel, such as in satellite radio, or otherwise select and control the performance of media content. The display 102 and user interface 104 on a preconfigured device may allow a user to select her present location from a list of available destination network admission coupons.

The content 110 represents different types of media including digital media that may be received by the device 100. Examples of the content 110 include, but are not limited to, digital music, talk audio data, television data, movie data, podcasts, sports data, weather data, news data, Internet data, and the like or any combination thereof. The content 110 can be either digital or analog in nature. The memory 108 of the device can be used to store content or other user and/or device data. The memory 108, for example, may store digital music and/or video, graphics, play lists, user preferences, device settings, and the like or any combination thereof.

Figure 2:
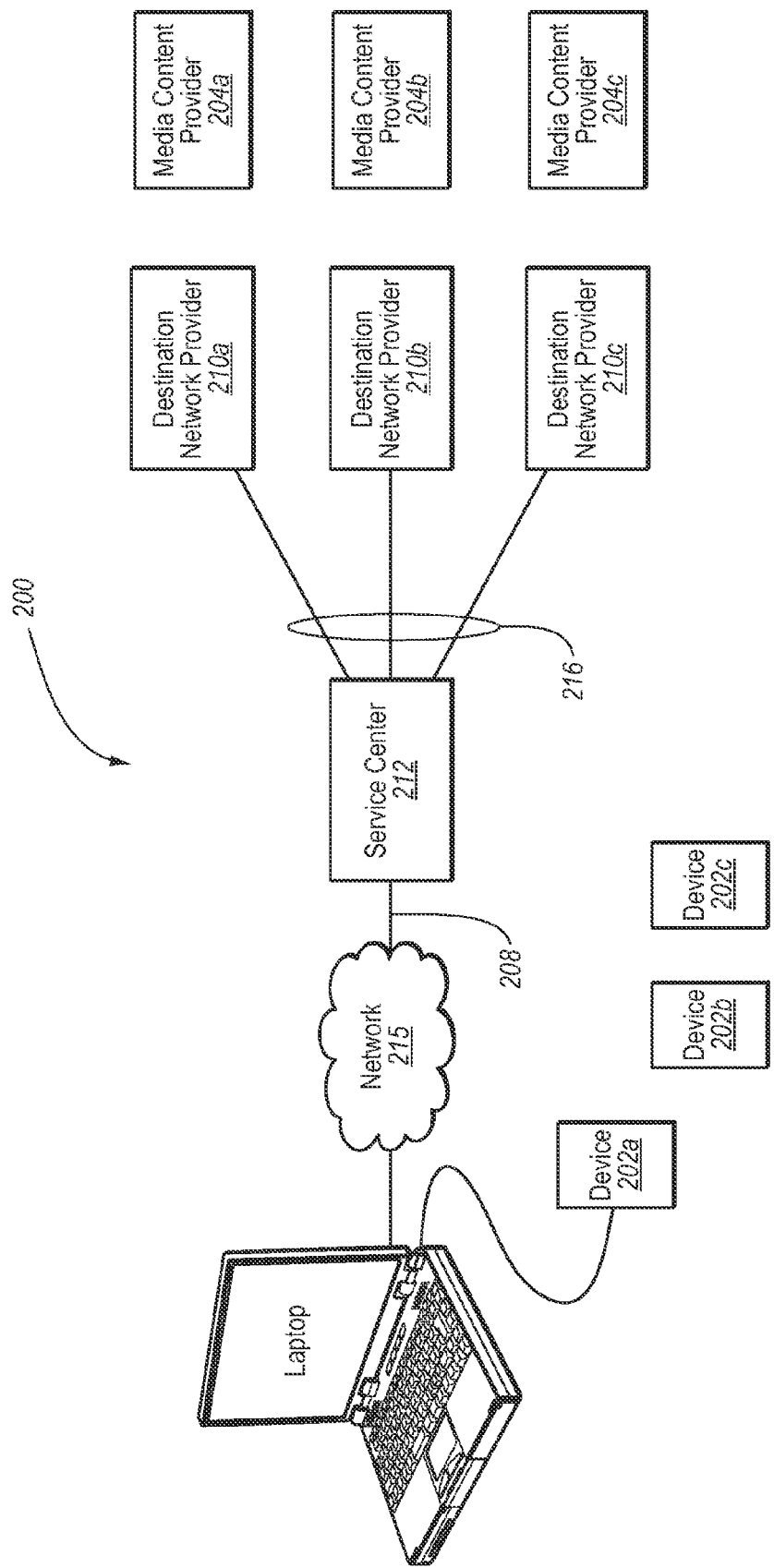
FIG. 2 illustrates an example environment in which a media device may be preconfigured to access one more destination networks.

FIG. 2 illustrates one example of an environment in which a media device 202 may be preconfigured to interface with networks in different physical locations. FIG. 2 includes a system 200 for enabling a media device 202 to create and register a device configuration such that the media device 202 may interface with multiple destination network providers 210a, 210b and 210c. The system 200 also includes a service center 212, which may be executing on server computer(s), for interfacing between the media device 202 and destination network access providers 210. The service center 212 may communicate with the media device 202 directly or through a network 215, as illustrated in FIG. 2. As described in detail herein, the service center 212 interfaces with the media device and the destination network providers 210 to satisfy network admission requirements and provide an admission coupon for the media device to gain access to the destination network. Further, the service center 212 may be used to register and store a particular device configuration. A device configuration, which may be used to manage device associations, can be shared among multiple devices and/or multiple users.

The media device 202 may include, for example, any of the devices described in reference to FIG. 1. The media content providers 204a, 204b, and 204c (collectively 204) may be representative of media sources providing digital media that may be received by the devices 202. Typically, a media device must be connected to a network to access the media content providers 204. The media content providers 204 may be sources through which a user may obtain music, Internet data, video, podcasts, text data, and the like or any combination thereof. Exemplary media content providers 204 may include, by way of example, satellite sources including digital radio and video, terrestrial sources, music downloads services, peer to peer networks, and the like or any combination thereof. The media content providers 204 may include free services that may be accessed free of charge. Alternatively, the media content providers 204 may include pay services that may only be accessed by clients who are billed a predetermined amount, for example, a monthly charge, or a charge that is based on volume of usage. Furthermore, the media content providers 204 may either provide open access to the public, or may require user authentication. As will be appreciated, for those media content providers that require user authentication, no content or services will be provided to a device 202 that does not provide the proper authentication.

A destination network provider 210 refers to a network access provider of any network that a user may desire to access with media device 202. Since the media device 202 may be portable, a user may want to use the device to access media content providers 204 from different physical locations, such as a coffee shop, a school, a place of employment, a library, a friend's house, a hotel, etc. A destination network provider refers to the network service provider of the particular location in which the media device 202 is used to access the media content providers 204. For example, if a user wanted to access media content providers 204 while visiting the home of a friend who has access to the Internet through a particular Internet service provider, then the destination network provider is the particular Internet service provider subscribed to by the friend. Typically, the service center 212 communicates with a destination network provider 210 via the destination network provider's website.

A destination network provider 210 may provide access to any network that is compatible with the devices 202 or the media content providers 204 and may include, by way of example, satellite networks, 802.11 networks, personal computer networks (e.g., LAN, WAN), wireless networks (e.g., Bluetooth, WiFi), cellular networks, telephony networks (e.g., landline or PSTN), data networks, the Internet, and the like or any combination thereof.

The service center 212 receives one or more data streams 208 from the media device 202, and likewise receives one or more data streams 216 from one or more of the media content providers 204 and/or destination network providers 210. Exemplary data streams 208 and 216 include, by way of example, wired and wireless computer networks (LAN, WAN, Internet, WiFi, WiMax, EVDO, Edge Networks, GPRS, and the like), satellite signals, terrestrial signals, and the like or any other reasonable data stream as well as the data itself.

Although illustrated as a single entity, the service center 212 can be implemented in a distributed computing environment where tasks are performed by local and remote processing devices that are linked (either by hardwired links, wireless links, or by a combination of hardwired and wireless links) through a communications network.

Figure 3:
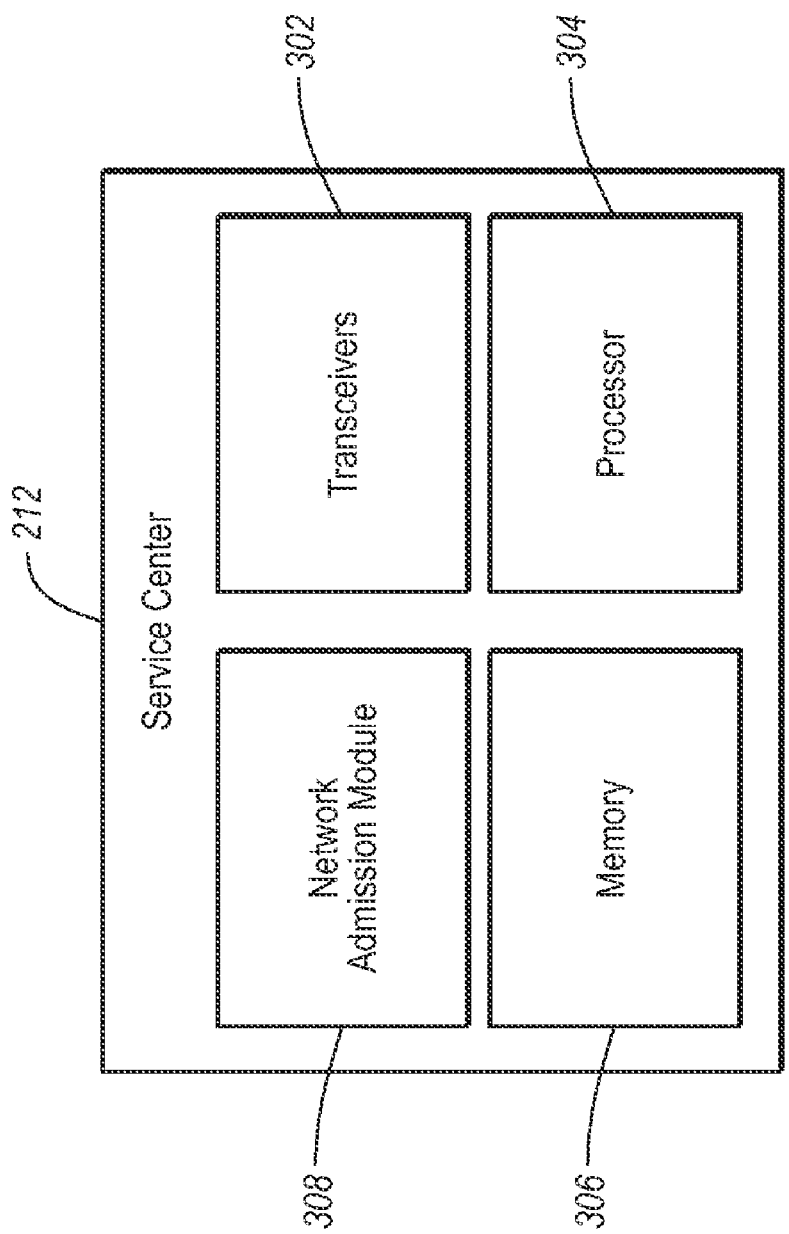
FIG. 3 illustrates a schematic drawing of an embodiment of the service center of FIG. 2.

Referring now to FIG. 3, a more detailed depiction is provided of the service center 212. The service center 212 may include one or more transceivers 302 (e.g., network interface cards, switches, etc.) for transferring data between itself and one or more portable media devices and also between itself and one or more media content providers. The transceivers 302 may include both wired and wireless transceivers for communicating with any of the destination network providers 210, devices 202 and media content providers 204. The service center 212 may further include one or more memory modules 306 for storing data received from the devices 202, the destination network providers and from the media content providers 204. For instance, the memory 306 may include one or more mapping tables including information about devices 202, destination network providers 210 and/or media content providers 204, such as the requirements necessary to access a particular destination network with a device 202. The service center 212 may also include a processor 304 configured to provide general purpose processing for the various modules of the service center as circumstances warrant.

As further illustrated, in some embodiments the service center 212 may also include a network admission module 308. Network admission module 308 may be configured to ensure that a media device is properly configured such that it may be able to gain access to a particular destination network. For example, network admission module 308 may communicate with the destination network providers 204 to determine what information and/or procedures are required for admission to a destination network. The network admission module 308 may also identify any hardware settings that may be needed to access the corresponding network. This information may then be provided to the device 202 upon request as will be described in more detail to follow. The network admission module 308 may be comprised of software, hardware, or any combination of software and hardware as circumstances warrant.

Figure 4:
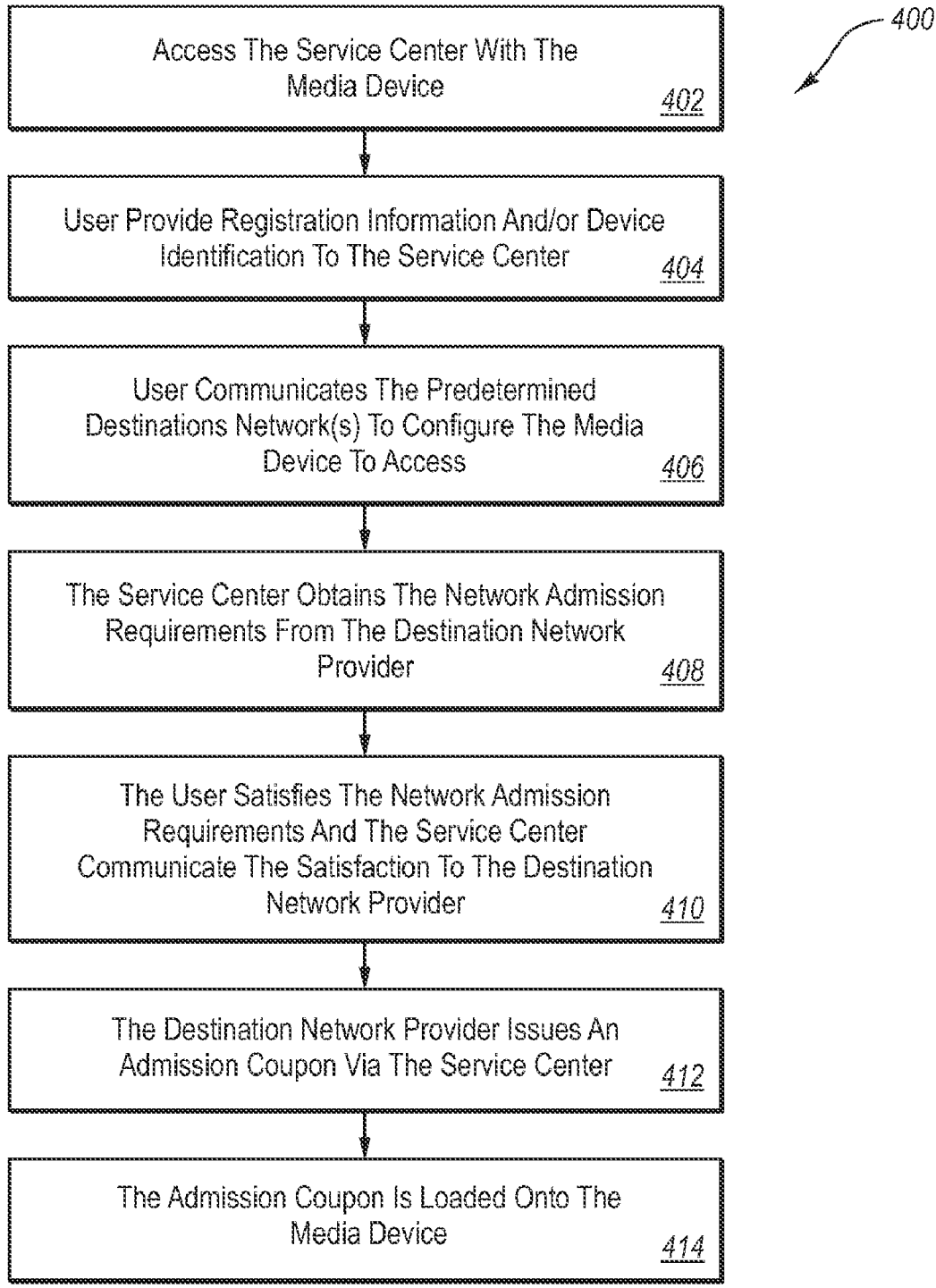
FIG. 4 illustrates a flow chart of an example method for pre-configuring a media device in the environment illustrated in FIG. 2 such that the media device may access networks from one or more physical locations.

Reference is now made to FIG. 4, which illustrates an example method of pre-configuring a media device in the environment illustrated in FIG. 2 such that the media device may access networks from one or more physical location. For example, a user may plan to take a business trip and may wish to download media content to a media device while staying in a hotel during the trip. One of skill in the art can appreciate that the network can be accessed for any purpose, which may included downloading media content.

While making reservations at particular hotel or at anytime before the trip, the user may verify that the hotel has an available network that can be accessed and configure a media device to access that network. Similarly, a user may wish to access other networks, which may be located near the hotel, such at a local coffee shop or from a private network at a place of employment. Pre-configuring the device via a local network, as illustrated in FIG. 2, ensures that the device will be capable of interfacing with the particular network in the destination location.

In one embodiment, a user can directly connect the media device to a home computer or laptop which is connected to the Internet, thereby allowing the media device to access 402 the service center via the Internet. The service center may be accessed by the media device 202 either directly or through a local network as is illustrated in FIG. 2. Once in communication with the service center 212, a user may provide 404 registration information and/or device identification to the service center by entering a username and password, a distinctive device serial number, or any other information to identify the device. The identity of the device, including the make and model of the device, may have some relevance to the device configuration as determined by the service center.

A user may then communicate 406 the particular destinations networks that the media device should be configured to access. In the example of a user planning a business trip, the user may pre-configure the media device to be able to access the available network at the hotel in which she is staying. In one embodiment, the user enters the hotel information into a form provided by the service center, for example using a web browser. The service center 212 then uses the hotel identification information to contact the destination network provider at the hotel and obtain 408 the network admission requirements. Alternatively, the destination network providers may register with the service center such that the information required to pre-configure the device is already available for use by the service center.

During this communication the network admission module 308 of the service center 212 may receive or otherwise determine the admission requirements that a particular destination network provider 210 calls for before a media device is allowed to access the destination network. For example, the admission requirements may include, but are not limited to, accepting certain terms and conditions of use, agreeing to comply with certain licensing procedures and security regulations, providing user identification information, providing device configuration information, providing prior payment for use, and the like or any combination thereof. For instance, some destination network providers 210 may only grant access to limited number of devices at a time. Some of the destination networks may charge for a subscription and require proof of payment, or the destination network provider may require that a user's addresses or home phone number be provided prior to access being granted. It will be appreciated that the admission requirements may include other conditions as circumstances warrant. Thus, the admission requirements may include any requirement that a destination network provider desires before it will grant permission to a media device 202 to be able to access the destination network.

In some embodiments, some destination network providers 210 may have a preexisting relationship with service center 212 and thus may have admission requirement information already stored in memory 306, for example in a mapping table. When a destination network provider 210 does not have a preexisting relationship with the service center 212, the service center 212 may perform an initialization routine upon connection to the destination network provider 210 to determine the admission requirements, which may then be stored in the memory 306.

The request for the admission to the destination network from the media device 202 may be sent to and received by the service center 212. That is, the request for the admission to the destination network is directed to the service center 212 rather than preceding directly to the destination network provider 210 so that service center 212 may act as an interface between the media device 202 and the destination network provider 210 to satisfy the admission requirements as will be explained in more detail.

In response to the request, service center 212, specifically the network admission module 308, may determine what information the destination network provider 210 requires before it will grant permission to the media device 202. In some embodiments, this determination is made by accessing the mapping table in memory 306. Alternatively, the admission information may be accessed directly from the media content provider.

Once the network admission module 308 has determined the admission requirements for the destination network, the service center 212 will ask the user to perform 410 the network admission requirements. For example, the user may need to provide identification information such as an address or the like and/or accept the terms and conditions of use for the destination network. In addition, the media device configuration information may be required. If the media device 202 has a preexisting relationship with the service center 212 such as a registered device configuration, then this information may have been previously stored in memory 306 and may be accessed by the service center 212.

Upon satisfaction of the admission requirements by the user, the service center 212 will convey the required information to the destination network provider 210. In one example, this may be accomplished by the service center 212 generating a digital certificate which is sent to the destination network provider 210. The digital certificate may include a timestamp or other information to preserve a record of the transaction.

Once the digital certificate is received and verified by the destination network provider 210, the destination network provider 210 will issue 412 an admission coupon via the service center. The admission coupon is then loaded 414 onto the media device 202. The admission coupon may be a data structure or the like that includes at least enough of the information needed for the media device 202 to gain permission to access the destination network. The authentication coupon may also include the DNS address for the desired network. In addition, the admission coupon may include instructions that configure the hardware and/or software media device 202 to be able to communicate properly with the destination network provider 210. The media device 202 is then allowed to access the destination network by providing the admission coupon upon communication with the network, as will be described in more detail.

As previously described, admission coupon will include all of the information that is necessary for device 202 to gain permission to access the destination network without the need for separate or additional authentication from the destination network provider.

There may be circumstances that cause one or more of the destination network providers 210 to update or change their admission requirements from time to time. For example, the destination network provider may add a new data field to the required information or may change an existing data field. As will be appreciated, the updated or changed admission information may render a previously authenticated device unable to access the destination network. Advantageously, embodiments of the present invention make the device immune to some changes in the admission requirements.

As discussed above, network admission module 308 communicates with the destination network providers 210 and determines the admission requirements. Accordingly, the network admission module 308 may also determine any updates or changes to the admission requirements when in communication with the destination network providers 210. In some embodiments, a change in the admission requirements may trigger an alert which notifies the user that a re-authentication may be necessary before the user is allowed access to the network in the future. The form of the notification may include, but is not limited to, a media device alert, a computer alert, or an email notification. Thus, allowing the user to avoid a lapse in network access. The new admission requirements may be stored in the memory 306 in some embodiments.

The network admission module 308 may then generate a new admission coupon based on the updated or changed authentication information. The new admission coupon may be provided to a media device 202 to ensure that the device retains the ability to be access to the desired destination network provider.

In some embodiments, the new admission coupon may be provided to the media device 202 when service center 212 receives a new request from the device. In such embodiments, where the media device 202 retains authentication after initially communicating with service center 212, the service center 212 may automatically provide the new admission coupon to the media device 202. Thus, the media device 202 is at least partially immune to any changes to the admission requirements as the service center 212 performs all the requisite processing of changes to the admission coupon. The media device 202 simply receives the new coupon and is thus able to communicate with the desired destination network.

As will be appreciated, it may be desirable for a media device 202 to be authenticated to more than one destination network provider 210. Accordingly, the process described above may be repeated such that access is granted for more than one destination network provider.

For example, a device 202 may have access to destination network provider 210*a*. The device 202 may also be authorized the by service center 212 to access the network of destination network provider 210*b* and/or 210*c* using the process described above. In some embodiments an admission coupon may be generated for each destination network provider 210 or for a grouping of destination network providers and provided to the device 202. In other embodiments, a single admission coupon may be generated that provides the required information for authentication to all the destination network providers 210. Thus, the principles of the present invention allow the service center 212 to provide admission coupons for multiple destination network providers to a device 202.

Likewise, the principles of the present invention allow the service center 212 to provide authorization for one or more destination networks to multiple devices. For instance, service center 212 may provide an admission coupon for destination network providers 210*a* to device 202*a* as previously described. In issuing the coupons, the service center 212 can account for the requirements of the destination network provider as well as the specifics of the device and/or the user of the device. Service center 212 may also provide the same or a substantially similar admission coupon to devices 202*b* and 202*c* in the manner described. Once the devices 202*b* and 202c are authenticated to the one or more destination network providers 210, these devices may directly access the associated destination networks Advantageously, the service center 212 may act as a single location where the media devices 202 may become authenticated prior to receiving authorization to access destination networks from the destination network providers 210. This removes the need for the devices 202 to contact each destination network provider 210 for authentication. In addition, service center 212 renders the devices 202 immune to any changes to the admission requirements as the service center 212 performs all the requisite processing of changes to the admission information and provides this to the devices 202.

Figure 5:
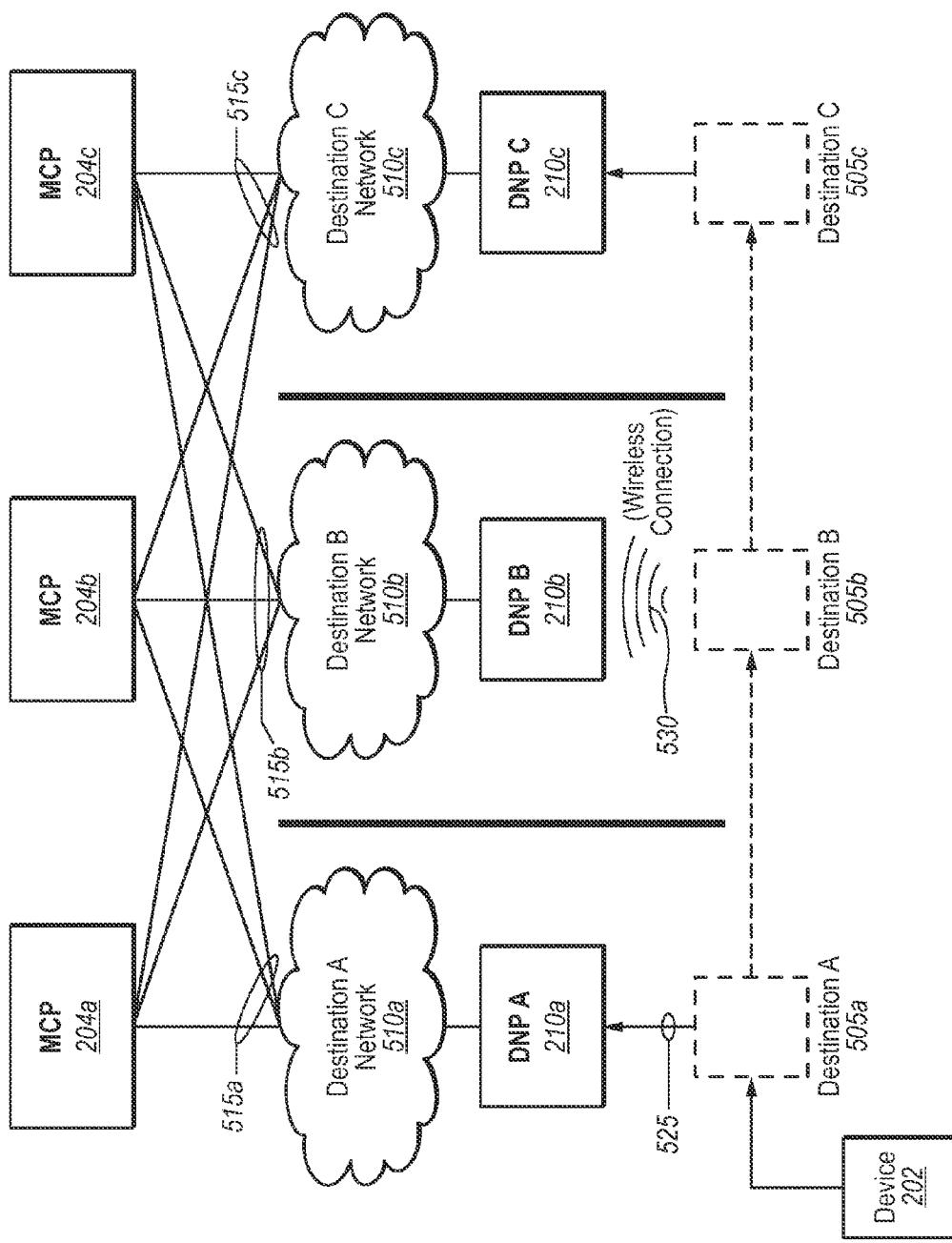
FIG. 5 illustrates an example environment in which a media device, preconfigured in the environment illustrated in FIG. 2, may be implemented to download media content.

Reference is now made to FIG. 5, which illustrates an example environment in which a media device 202, preconfigured in the environment illustrated in FIG. 2, may be implemented to access various networks, for example to download media content or perform other actions over the corresponding networks. Destination A 505a, Destination B 505b, and Destination C 505c (collectively 505) each represent a different physical location in which the media device 202 may be used to download media content from media content providers 204.

In this example, the media device 202 has been preconfigured to access the destination networks 510a, 510b, and 510c (collectively 510) in each of the destinations 505. Thus, the media device 202 has received or has access to an admission coupon for each of the three destination network providers 210a-210c. Therefore, a user may take the device 202 to Destination A 505a, a library for example, and download media content from the media content providers 204a-c or perform other action over the network. Depending on the configuration of the particular network hardware at the destination location, a media device may access a destination network various ways, including wirelessly, via a cable connection, via a computer or a laptop, and/or any combination thereof. As illustrated in FIG. 5 by way of example, the Destination A network 510a is accessed by the media device 202 via a cable connection as represented by arrow 525.

The user may also travel with the device 202 to Destination B 505b, a coffee shop for example, and download media content from the same media content providers 204, as represented by 515b. As shown in FIG. 5, the Destination B network 510b may be accessed wirelessly by the media device, as represented by 530. It will be appreciated that the media device 202 can download media content from any destination having an available network that it has been preconfigured to access.

Figure 6:
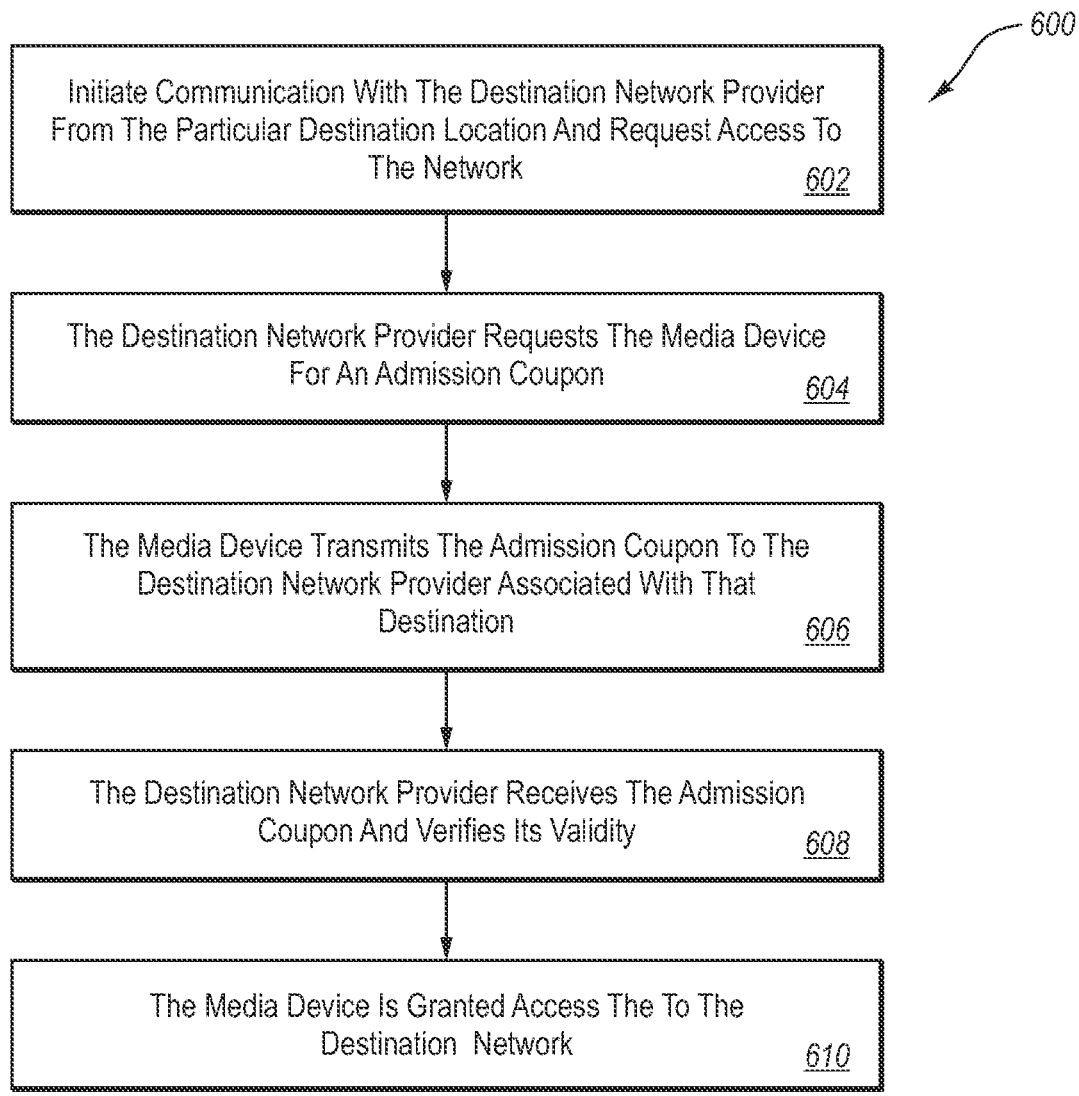
FIG. 6 illustrates a flow chart of a method for utilizing a preconfigured media device to download media content via a predetermined destination network.

Reference is now made to FIG. 6, which illustrates a method 600 for utilizing a preconfigured media device to access a network associated with a predetermined destination network. The method includes initiating 602 communication with the destination network provider 210 from the particular destination location and requesting access to the network. In one embodiment, the media device 202 may list all the destinations that it has been preconfigured to access on its display 102, and allow a user to choose the particular destination where she is located via the user interface 104. The media device will then query the destination network associated with that location for access to the network. As mentioned above in reference to FIG. 5, the media device may communicate with the destination network either wirelessly, via a cable connection, via a computer or laptop, and/or any combination thereof.

In response to the media device's request for access, the destination network provider 210 will ask 604 the media device for an admission coupon. In one example, this may include presenting an authentication page to the device, even though the page may not be viewable or presentable on the user's device. After receiving the request for an admission coupon, the media device will then transmit 606 the admission coupon to the destination network provider associated with that destination. This may be performed, for example, by the device transmitting the information that is typically requested in the page. The destination network provider 210 receives the admission coupon and verifies 608 its validity. The media device is granted 610 access the to the destination network.

Alternatively, the device may direct the destination network provider to the service center, which may provide the admission coupon on behalf of the device. In this instance, the device may provide authentication that can be used to properly identify the device for various purposes, including billing.

Embodiments herein may comprise a special purpose or general-purpose computer including various computer hardware. Portable media devices are examples of special purpose computers. Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a system including a media device that receives content or services via a network connection and a center for managing access to a plurality of destination networks, a method performed by the service center for pre-configuring the media device so that the media device may access one or more of the plurality of destination networks without requiring a user to input information to a user interface provided on the media device, the method comprising:

receiving a request from a media device for authorization from a selected destination network provider to access a predetermined destination network, the request being received over an internet connection established by a computer system to which the media device is connected, the request including registration information for registering the media device to access the predetermined destination network, the registration information having been input to the computer system by a user;

determining the destination network admission requirements that are required by the selected destination network provider in order for the media device to be authorized to access the predetermined destination network directly without using the internet connection of the computer system;

sending a request to the computer system to be displayed on the computer system, the request requesting information from the user to comply with the destination network admission requirements;

receiving the requested information from the computer system;

providing the requested information to the selected destination network provider;

receiving a network admission coupon from the selected destination network provider; and providing the network admission coupon to the media device via the computer system, wherein the network admission coupon is configured to authorize the media device to access the predetermined destination network directly without using the internet connection of the computer system and without the need for additional authentication from the selected destination network provider such that the media device is configured to access the predetermined destination network by the user inputting the registration information and the requested information to the computer system rather than to a user interface provided on the media device.

2. The method in accordance with claim 1, wherein the registration information comprises one or more of: a username and password, or an identifier of the media device.

3. The method in accordance with claim 1, wherein the requested information comprises one or more of: the acceptance of terms and conditions of use of the destination network, device configuration settings, user identification information, or payment information.

4. The method in accordance with claim 1, wherein the selected destination network provider is a first destination network provider, the predetermined destination network is a first predetermined destination network, and the request for authorization is a first request, the method further comprising:

receiving a second request from the media device for authorization from a second selected destination network provider to access a second predetermined destination network, the second request being received directly from the media device via the first predetermined destination network;

determining the destination network admission requirements that are required by the second selected destination network provider in order for the media device to be authorized to access the second predetermined destination network;

processing a second network admission coupon based on the destination network admission requirements required by the second selected destination network provider; and providing the second network admission coupon to the media device via the first destination network, wherein the second network admission coupon is configured to authorize the media device to directly access the second predetermined destination network without the need for additional authentication from the second selected destination network provider.

5. The method in accordance with claim 1, further comprising:

determining that the destination network admission requirements required by the selected destination network provider have been changed; and generating an alert which notifies the user of the media device that the destination network admission requirements required by the selected destination network provider have been changed.

6. The method in accordance with claim 5, wherein the alert which notifies the user of the media device that the destination network admission requirements required by the selected destination network provider have been changed is in the form of a media device alert sent directly to the media device, a computer alert sent to the computer system, an email notification, or any combination thereof.

7. The method in accordance with claim 1, further comprising:

determining that the destination network admission requirements required by the selected destination network provider have been changed;

generating a second network admission coupon based on the changes to the destination network admission requirements; and providing the second network admission coupon to the media device, wherein the second network admission coupon is configured to allow the media device to continue to access the predetermined destination network without the need for additional authentication from the selected destination network provider.

8. The method in accordance with claim 7, wherein the second network admission coupon is provided directly to the media device upon receipt of a request from the media device.

9. The method in accordance with claim 7, wherein the second network admission coupon is provided directly to the media device automatically upon the processing of the second network admission coupon.

10. The method in accordance with claim 1, wherein the media device is a first media device, the method further comprising:

receiving a request from a second media device for authorization from the selected destination network provider to access the predetermined destination network; and providing the network admission coupon to the second media device, wherein the network admission coupon is further configured to authorize the second media device to access the predetermined destination network without the need for additional authentication from the selected destination network provider.

11. The method in accordance with claim 1, wherein processing a network admission coupon further comprises:

receiving additional information necessary to process the network admission coupon from the media device.

12. The method in accordance with claim 1, wherein the network admission coupon includes at least one of user information, device configuration information, payment information, or address information.

13. The method in accordance with claim 10, further comprising:

prior to providing the network admission coupon to the second media device, receiving authorization from the first media device to provide the network admission coupon to the second media device.

14. The method in accordance with claim 13, wherein the authorization received from the first media device comprises an identifier of the second media device.

15. In a system including a media device that receives content or services via a network connection and a service center for managing access to a plurality of destination networks, a method, performed by the media device, to receive authentication to access one or more of the plurality of destination networks without requiring a user to input information to a user interface provided on the media device, the method comprising:
  sending a request, via an internet connection of a computer system to which the media device is connected, to an external service center to obtain authorization from a particular destination network provider to access a predetermined destination network, the request including registration information for registering the media device to access the predetermined destination network, the registration information having been input to the computer system by a user such that the user need not input the registration information to a user interface on the media device;
  receiving, from the service center via the internet connection of the computer system, a network admission coupon provided by the particular destination network provider;
  accessing the predetermined destination network directly, without using the internet connection of the computer system, using the network admission coupon to authenticate with the predetermined destination network;
  receiving an updated network admission coupon from the service center via the predetermined destination network; and
  accessing the predetermined destination network directly using the updated network admission coupon to authenticate with the predetermined destination network such that the media device retains access to the predetermined destination network without requiring the user to input information to a user interface on the media device to generate the updated network admission coupon.

16. The method in accordance with claim 15, further comprising:
  prior to receiving the network admission coupon, receiving a request from the service center that requires the user to one or more of: accept terms and/or conditions of use; provide device identification information; provide user identification information; or provide payment; and
  displaying a user interface in a browser on the computer system, the user interface prompting the user to fulfill the request by interacting with the user interface displayed in the browser.

17. The method in accordance with claim 15, wherein the network admission coupon includes at least one of user information, device configuration information, payment information, or address information.

18. The method in accordance with claim 15, wherein the particular destination network provider is a first destination network provider, the predetermined destination network is a first predetermined destination network, and the network admission coupon is a first network admission coupon, the method further comprising:
  requesting, via the first predetermined destination network, the external service center to obtain authorization from a second particular destination network provider to access a second predetermined destination network;
  receiving, via the first predetermined destination network, a second network admission coupon from the second particular destination network provider, the second network admission coupon authenticating access to the second predetermined destination network by the second particular destination network provider without the need for additional authentication from the second particular destination network provider.

19. The method in accordance with claim 15, wherein the updated network admission coupon is received from the external service center whenever changes to the network admission requirements of the particular destination network provider occurs.

20. The method in accordance with claim 15, further comprising:
  receiving, via the predetermined destination network, a notification from the external service center that the network admission requirements of the particular destination network provider have been modified.

21. The method in accordance with claim 15, wherein the media device, the external service center, and the particular destination network provider are connected via a wired or wireless network, wherein the wireless network is one or more of an 802.11 network, a terrestrial network, a cellular network, and a satellite network.

22. The method in accordance with claim 15, wherein the media device is one of is one of a satellite radio device, a portable audio player, a portable DVD or CD player, a personal computer, a laptop computer, a cellular telephone, a personal digital assistant (PDA), or any combination thereof.

* * * * *